United States Patent
Guest

[11] Patent Number: 5,390,969
[45] Date of Patent: Feb. 21, 1995

[54] COLLETS FOR TUBE COUPLINGS

[76] Inventor: John D. Guest, "Iona", Cannon Hill Way, Bray, Maidenhead, Berks, United Kingdom

[21] Appl. No.: 118,991

[22] Filed: Sep. 9, 1993

[30] Foreign Application Priority Data

Sep. 9, 1992 [GB] United Kingdom ............... 9219041

[51] Int. Cl.⁶ ............................................. F16L 35/00
[52] U.S. Cl. .................................... 285/38; 285/322
[58] Field of Search .............. 285/322, 323, 382.7, 285/38

[56] References Cited

U.S. PATENT DOCUMENTS

| 2,230,725 | 2/1941 | Nathan | 285/340 X |
| 3,501,177 | 3/1970 | Jacobs | 285/382.7 X |
| 4,062,574 | 12/1977 | Scholin | 285/340 |
| 4,637,636 | 1/1987 | Guest | 285/323 X |
| 4,645,246 | 2/1987 | Guest | 285/323 |
| 5,171,045 | 12/1992 | Pusbrig | 285/322 X |

FOREIGN PATENT DOCUMENTS

| 1001248 | 8/1965 | United Kingdom | 285/340 |
| 1520742 | 8/1978 | United Kingdom . | |
| 1573757 | 8/1980 | United Kingdom . | |
| 2132296B | 2/1986 | United Kingdom . | |

Primary Examiner—Dave W. Arola
Attorney, Agent, or Firm—Baker & Daniels

[57] ABSTRACT

The disclosure relates to a cylindrical collet for a tube coupling body, the collet having at least one arm of arcuate cross section which is free to flex radially under the action of an encircling tapered cam surface in the tube coupling body. The arm has a projecting tooth on its radially inner side having an inner edge to engage and grip a tube extending through the collet. The inner edge of the tooth extends linearly transversely of the arm to engage the tube tangentially and, with pressure from said cam surface, to bite into the surface of the tube.

11 Claims, 3 Drawing Sheets

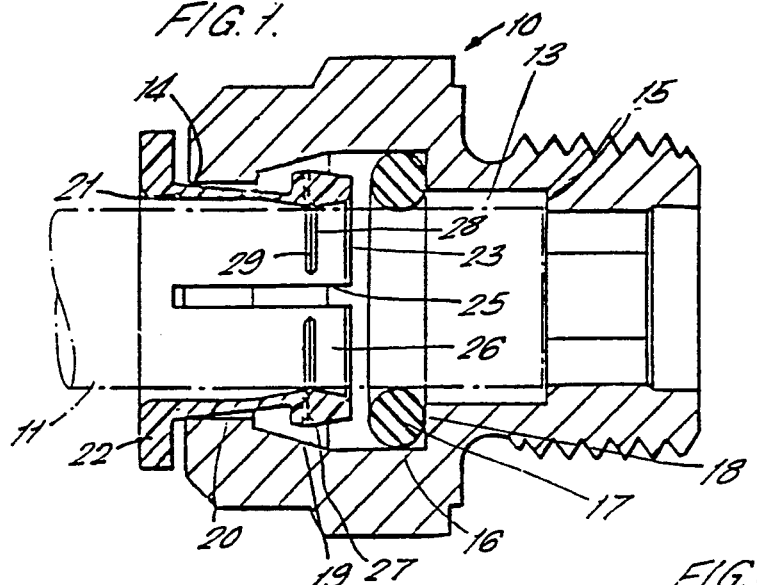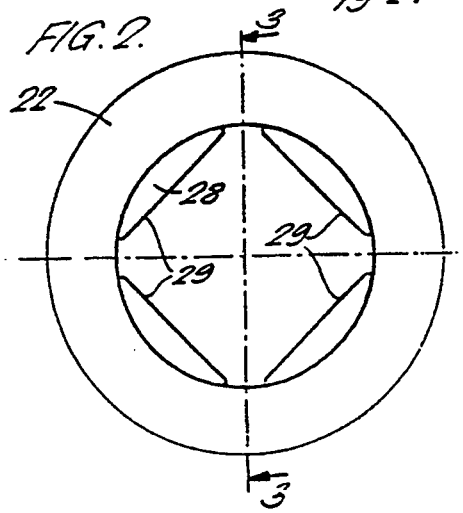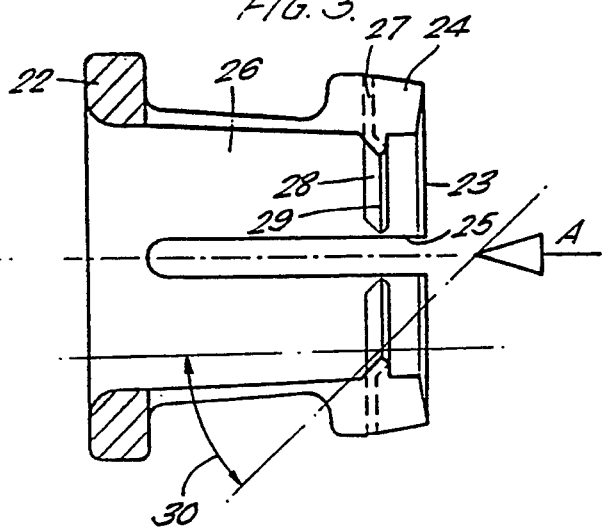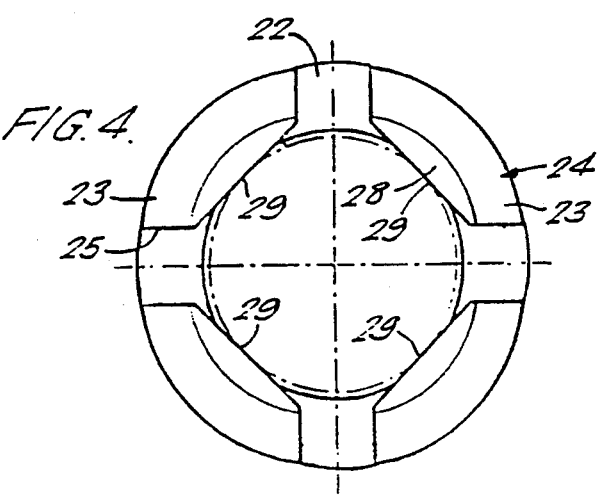

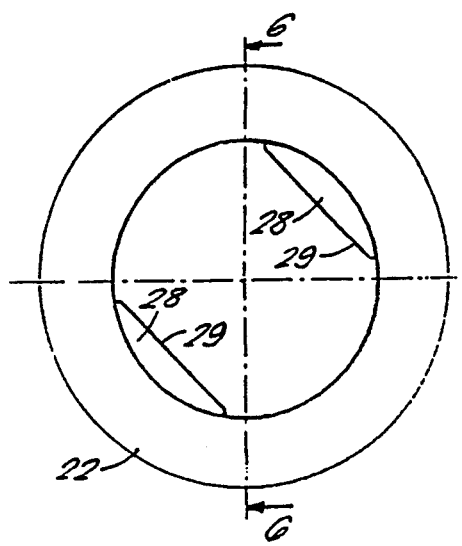
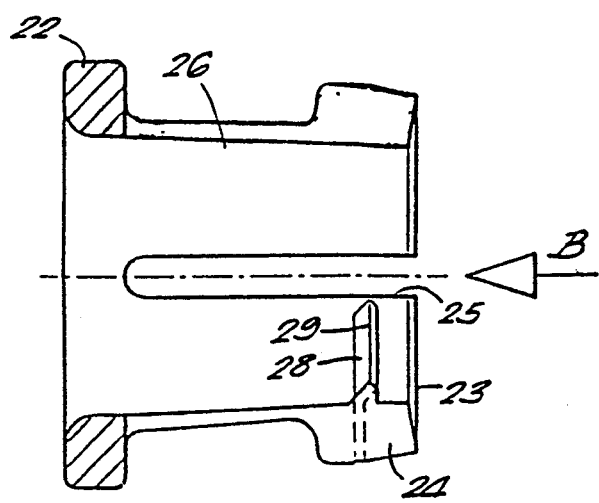
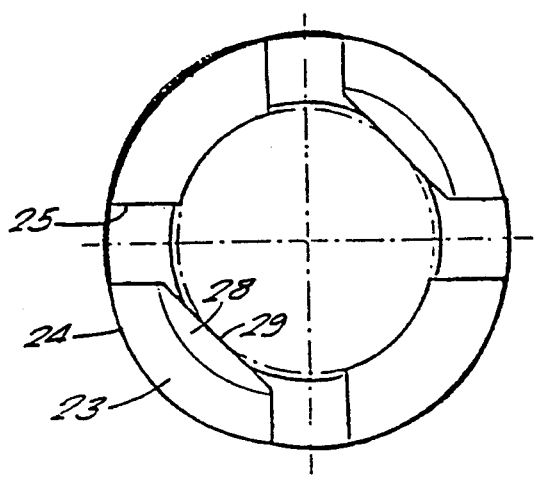

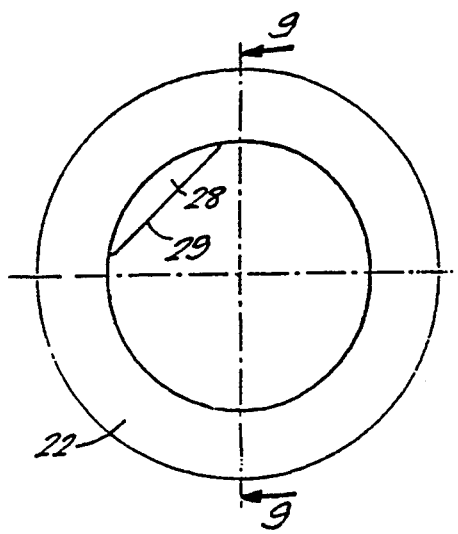
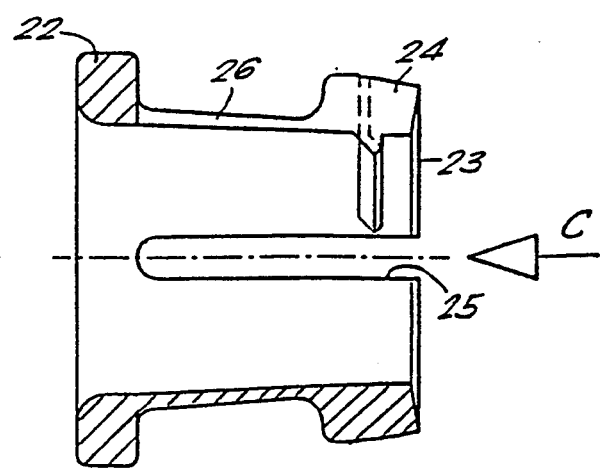
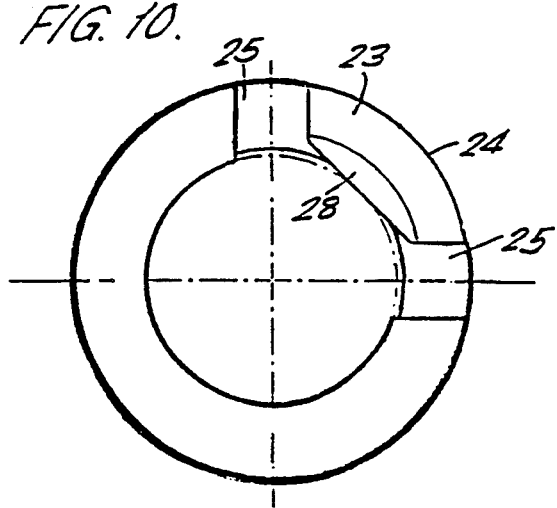
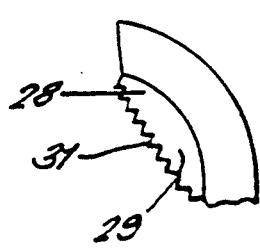
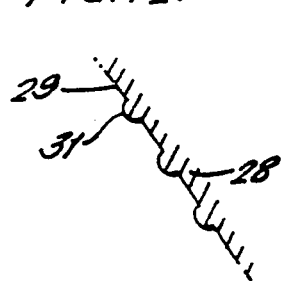
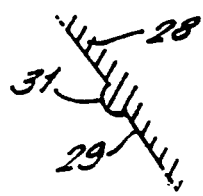

COLLETS FOR TUBE COUPLINGS

BACKGROUND OF THE INVENTION

1. Field of the Invention

This invention relates to collets for tube couplings which receive and automatically grip and hold a tube inserted in the coupling.

2. Background Prior Art

More particularly the invention relates to collets for tube couplings of the kind having a body formed with a throughway open at one end and having a encircling cam surface tapering towards said open end with a cylindrical collet located in the open end of the throughway and projecting into the throughway to receive a tube, the collet being formed with flexible arcuate section arms having projecting teeth on their inner surfaces to engage the tube and engageable on their outer surfaces with the tapered cam surface so that outward movement of the collet causes the arms to be pressed inwardly to grip and hold the tube in the bore. Hence, a pull on the tube, causes the collet arms to be pressed into tighter engagement with the tube. The tube may be released from such a coupling by pressing or holding the collet axially inwardly of the coupling body whilst the tube is withdrawn. Examples of said tube couplings are described and illustrated in my U.K. Patent No. 1520742, U.K. Patent No. 1573757 and U.K. Patent No. 2132296.

My U.K. Patent No. 1573757 discloses a particular form of collet in which the inner surface of the radially flexible arm of the collet is formed with an inwardly projecting tooth to engage and grip the tube inserted through the collet. The projecting tooth enhances the grip of the arm with the tube and it is an object of the present invention to further enhance the grip which the arm can apply to the tube.

SUMMARY OF THE INVENTION

This invention provides a cylindrical collet for a tube coupling, the collet having at least one arm of arcuate cross section which is free to flex radially under the action of an encircling tapered cam surface in the tube coupling, the arm having a projecting tooth on its radially inner side having an inner edge to engage and grip a tube extending through the collet, wherein the inner edge of the tooth extends linearly transversely of the arm to engage the tube tangentially and, with pressure from said cam surface, to bite into the surface of the tube.

More specifically, the or each flexible arm may be formed by spaced slots extending through the wall of the cylindrical collet from one end of the collet.

In one specific arrangement in which a single flexible arm is provided, the slots defining the arm may be spaced apart by 90° around the axis of the collet and the remaining part-cylindrical portion of the collet supports the tube against the action of the resilient arm.

In another specific arrangement, the collet may be formed with four equi-spaced resilient arms, at least two of which arms disposed diametrically opposite each other have said linerarly edged teeth.

In a modified form of the letter arrangement, all four arms may be provided with said linearly edged teeth.

In any of the above arrangements, the collet may be formed from a flexible plastics material and the or each flexible arm of the collet having a tooth may have a metal insert moulded into the arm to project from the inner side thereof and provide the linear edged tooth.

In a particular preferred construction according to the invention, the metal insert may comprise an arcuate base portion moulded into the arm with an inner peripheral portion projecting from the inner surface of the arm and angled to provide an inwardly facing linear edge projecting through the tooth to engage and grip the tube extending through the collet.

In any of the above arrangements, the end of the collet in which said resilient arm or arms are formed is also formed with an enlarged encircling head around its outer periphery to engage the tapered cam surface in the throughway.

Also, in any of the above arrangements, the end of the collet remote from said flexible arm may have an outturned encircling flange to enable the collet to be gripped.

The invention also provides a tube coupling comprising a coupling body having a throughway open at one end to receive a collet, in accordance with any of the above arrangements, the coupling body having a cam surface encircling the throughway and tapering towards said open end to engage the flexible arm or arms of the collet.

BRIEF DESCRIPTION OF THE DRAWINGS

FIG. 1 is a longitudinal section through a tube coupling including a collet for locking a tube in the coupling;

FIG. 2 is an end view of the collet employed in the tube coupling of FIG. 1;

FIG. 3 is a section along the line 3—3 on FIG. 2;

FIG. 4 is a view looking in the direction of the arrow A on FIG. 3;

FIG. 5 is a similar view to FIG. 2 showing a further form of collet;

FIG. 6 is a section along the line 6—6 on FIG. 5;

FIG. 7 is a view looking in the direction of the arrow B on FIG. 6;

FIG. 8 is an end view of yet a further form of collet in accordance with the invention;

FIG. 9 is a section along the line 9—9 of FIG. 8;

FIG. 10 is a view looking in the direction of the arrow C on FIGS. 9; and 11 to 13 show further modifications.

DESCRIPTION OF THE PREFERRED EMBODIMENTS

Referring firstly to FIG. 1 of the drawings, there is shown a tube coupling comprising a coupling body 10 for affecting a coupling to a tube 11 using a collet 12. A throughway 13 extends into the coupling body from an open end 14 and has a shoulder 15 forming an end stop for the tube 11 when inserted in the coupling. An enlarged diameter portion 16 of the throughway contains an O-ring 17 which abuts the shoulder 18 in the coupling body and which, in use, seals against the external surface of the tube 11 and against the internal wall surface of the throughway in the coupling.

The enlarged diameter portion 16 of the throughway extends towards the open end 14 and is formed with a tapered portion 19 providing an encircling cam surface tapering towards a narrow diameter section 20 adjacent the open end 14 of the body.

The collet 12 which is moulded in a plastics material extends into the coupling body from said open end 14 and comprises a cylindrical portion 21 having, on the outer side of the tube coupling body, an out-turn flange 22 to enable the collet to be gripped for manipulating the collet.

The other end 23 of the collet extending into the throughway is formed with an encircling head 24 and slot 25 extend from the end 23 of the collet towards the flanged end of the collet at four equi-spaced locations around the collet to divide the collet into four arcuate cross section flexible arms 26. Arcuate plates 27 are moulded into the head portions of the arms and inner edge portions 28 of the plates form teeth which project from the inner surfaces of the head portions and are angled to provide inwardly facing edges 29 to engage and bits into the surface of the tube 11 inserted in the collet. The angle of the inner edge portions can be varied as indicated at 30 according to the grip required. The edge portions could be angled up to 90° to the plates 27 but typically would be angled at about 40° to the plate portions.

A small extraction movement of the collet 12 engages the outer sides of the head portions 24 with the tapered cam surface 19 in the throughway to press the head portions inwardly and cause the edges 29 of the arcuate plates to bite into the surface of the tube to grip and hold the tube in the tube coupling body.

Reference is now made to FIGS. 2-4 of the drawings which show an improvement to the collet in accordance with the invention in which the projecting inner edge portion or tooth 28 on the arcuate plate 27 extends linearly to provide a straight edge 29 to bite tangentially into the tube as best seen in FIG. 4.

FIGS. 5-7 show a modified version in which only two of the resilient arms 26 disposed diametrically across the collet are formed with inwardly projecting teeth, the other arms being of plain form to engage the surface of the tube without biting into it.

FIGS. 8-10 show yet a further arrangement in which only one pair of slots 25 is formed 90° apart around the collet to provide one resilient arm 26 with its inwardly projecting tooth 28 and the remaining three-quarter cylindrical part of the collet is of plain internal form to engage the tube.

It will be understood that the collet can be formed with any practical number of flexible arms according to the size of the collet and the arrangements illustrated above are by way of example only. In those instances where a plurality of flexible arms are provided each with an inwardly projecting tooth to engage the tube, the engagement of one arm only with the tube should be sufficient to retain the tube so that should the teeth of the other arm or arms fail for any reason, such as overheating or chemical attack, the remaining arm will provide sufficient grip to retain the tube.

FIG. 11 of the drawings shows a modification to the edge portion 28 of a plate 27 in which the inner edge 29 is formed with serrations 31. FIG. 12 shows a version with spaced apart serrations and FIG. 13 shows a single serration.

I claim:

1. A cylindrical collet for a tube coupling body, the collet having a wall and an arm of arcuate cross section which is free to flex radially under the action of an encircling tapered cam surface in the tube coupling body, the arm having a tooth which projects radially inwardly from an inner side of said arm, said tooth having an inner edge to engage and grip a tube extending through the collet, the inner edge of the tooth extending linearly transversely of the arm to engage a said tube tangentially and, with pressure from said cam surface, to bite into the surface of the tube.

2. A collet as claimed in claim 1, wherein spaced slots extend through said wall from one end of the collet to define said arm.

3. A collet as claimed in claim 2, including a single only arm, said slots defining said single only arm spaced apart by 90° around the axis of the collet, the remaining portion of said wall supporting a said tube against the action of said arm.

4. A collet as claimed in claim 2, wherein the collet includes four equi-spaced said arms, at least two said arms disposed diametrically opposite each other, each said two opposed arms including a said tooth with a linear transverse extending edge.

5. A collet as claimed in claim 2, wherein the collet includes four said arms, each said arm including a said tooth with a linear transverse extending edge.

6. A collet as claimed in claim 1, wherein the collet is formed from a flexible plastics material and said arm includes a metal insert moulded into said arm to project from the inner side thereof and define said tooth.

7. A collet as claimed in claim 6, wherein said metal insert comprises an arcuate base portion moulded into said arm with an inner peripheral portion projecting from the inner surface of the arm and angled to provide said inwardly facing linear edge.

8. A collet as claimed in claim 6, wherein said inner edge includes at least one serration.

9. A collet as claimed in claim 1, wherein said arm includes an enlarged encircling head around its outer periphery in the area of said tooth to engage the said tapered cam surface.

10. A collet as claimed in claim 1, wherein the end of the collet remote from said arm has an out-turned encircling flange to enable the collet to be gripped and moved axially with respect to the tube coupling body to selectively lock and release a tube in the body.

11. A tube coupling comprising a collet and a coupling body having a throughway open at one end to receive said collet, said coupling body having a cam surface encircling said throughway and tapering radially inwardly towards said open end, said collet having a wall and an arm of arcuate cross section which is free to flex radially under the action of said inwardly tapering cam surface, said arm having a tooth which projects radially inwardly from an inner side of said arm, said tooth having an inner edge to engage and grip a tube extending through said collet, the inner edge of said tooth extending linearly transversely of the arm to engage a said tube tangentially and, with pressure from said cam surface, to bite into the surface of the said tube.

* * * * *